(12) United States Patent
Singer Hansen et al.

(10) Patent No.: US 12,522,149 B2
(45) Date of Patent: Jan. 13, 2026

(54) FASTENING ASSEMBLY, A CROSS BAR COMPRISING THE FASTENING ASSEMBLY, AND A METHOD OF MOUNTING THE CROSS BAR AND THE FASTENING ASSEMBLY TO A TRUCK BED

(71) Applicant: Mountain Top (Denmark) ApS, Frederikssund (DK)

(72) Inventors: Peter Singer Hansen, Fredensborg (DK); Robert Ansingh, Gwelup (AU)

(73) Assignee: Mountain Top (Denmark) ApS, Frederikssund (DK)

( * ) Notice: Subject to any disclaimer, the term of this patent is extended or adjusted under 35 U.S.C. 154(b) by 42 days.

(21) Appl. No.: 18/836,666

(22) PCT Filed: Mar. 13, 2023

(86) PCT No.: PCT/EP2023/056320
§ 371 (c)(1),
(2) Date: Aug. 7, 2024

(87) PCT Pub. No.: WO2023/174854
PCT Pub. Date: Sep. 21, 2023

(65) Prior Publication Data
US 2025/0319823 A1     Oct. 16, 2025

(30) Foreign Application Priority Data

Mar. 14, 2022  (DK) .................. 2022 70101

(51) Int. Cl.
*B60R 9/058*     (2006.01)
*B60R 9/052*     (2006.01)

(52) U.S. Cl.
CPC .............. *B60R 9/058* (2013.01); *B60R 9/052* (2013.01)

(58) Field of Classification Search
CPC ................................ B60R 9/058; B60R 9/052
(Continued)

(56) References Cited

U.S. PATENT DOCUMENTS 6,305,589 B1   10/2001   Chimenti et al.
7,328,823 B2 *  2/2008   Allen ...................... B60R 9/045
                                                    224/330

(Continued)

FOREIGN PATENT DOCUMENTS

CN         105083139      11/2015
EP           3153350       4/2017

OTHER PUBLICATIONS

International Search Report and Written Opinion for International PCT Patent Application No. PCT/EP2023/056320 mailed Jun. 14, 2023 (8 pages).

*Primary Examiner* — Scott T McNurlen
(74) *Attorney, Agent, or Firm* — Fox Rothschild LLP (57) ABSTRACT

A fastening assembly (2) is adapted for releasably connecting a load-carrying cross bar (1) to a vehicle. The fastening assembly (2) comprises a cross bar mounting part (3) with a protruding first hinge part (4), and a vehicle mounting part (5) with a second hinge part (6) adapted for releasably and pivotably coupling with the first hinge part (4). The first hinge part (4) comprises a tubular first assembling part (7a). The second hinge part (6) comprises a second assembling part (7b) with opposite shaft bearings (16; 18) at opposite ends of a mounting base part (33) and is adapted to pivotally receive the tubular first assembling part (7a). A shaft (27) is releaseably arranged through the opposite shaft bearings (16; 18) to pivotably connect the first hinge part (4) and the second hinge part (6).

16 Claims, 7 Drawing Sheets

(58) Field of Classification Search
USPC .......................................... 224/325, 329–330
See application file for complete search history.

(56) References Cited

U.S. PATENT DOCUMENTS

| | | | | |
|---|---|---|---|---|
| 7,328,824 | B2* | 2/2008 | Smith | B60R 9/058 |
| | | | | 224/326 |
| 8,104,651 | B2* | 1/2012 | Bingham | B60R 9/058 |
| | | | | 224/322 |
| 11,912,241 | B2* | 2/2024 | Christensen | B60R 9/048 |
| 12,214,751 | B2* | 2/2025 | Alma | B60R 9/058 |
| 2004/0134951 | A1 | 7/2004 | Allen | |
| 2006/0273123 | A1* | 12/2006 | Settelmayer | B60R 9/045 |
| | | | | 224/325 |
| 2007/0110539 | A1* | 5/2007 | Klinkman | B60P 7/15 |
| | | | | 410/150 |
| 2010/0252595 | A1 | 10/2010 | Heuchert et al. | |
| 2016/0229349 | A1 | 8/2016 | Cropley et al. | |
| 2019/0232881 | A1* | 8/2019 | Aftanas | F16B 2/10 |

* cited by examiner

Fig. 12 ial Application No. PA 2022 70101, filed on Mar. 14, 2022. The entire contents of these patent applications are herein incorporated by reference.

FASTENING ASSEMBLY, A CROSS BAR COMPRISING THE FASTENING ASSEMBLY, AND A METHOD OF MOUNTING THE CROSS BAR AND THE FASTENING ASSEMBLY TO A TRUCK BED

CROSS REFERENCE TO RELATED APPLICATIONS

This application is a U.S. National Phase Application of PCT International Application No. PCT/EP2023/056320, filed on Mar. 13, 2023, which is an International Application of and claims the benefit of priority to Danish Patent Application No. PA 2022 70101, filed on Mar. 14, 2022. The entire contents of these patent applications are herein incorporated by reference.

The present invention relates to a fastening assembly adapted for releasably connecting a load-carrying cross bar to a vehicle, a cross bar mounting part with a protruding first hinge part, and a vehicle mounting part with a second hinge part adapted for releasably and pivotably coupling with the first hinge part. The fastening assembly of the present invention is in particular suited for being mounted crosswise a truck bed or pick-up bed to be used as a part of a cargo carrier means.

Australian patent application no. 2015252083 discloses an assembly for releasably connecting a cross bar to a roof of a vehicle.

This known assembly comprises a body affixed to the cross bar, and a base affixed to the roof of the vehicle. The base has a receiving portion for receiving the body. Opposite short spring-biased locking pins slidably engage blind cavities of the base in a locked position. The opposite locking pins are moved towards each other by applying force to exposed protruding arms of actuators connected to the respective locking pins. Said locking pins are kept constantly urged apart in the locked position due to applied spring force. Thus the distance between the locking pins are increased in the locked position. By moving the actuators towards each other again the distance between the locking pins can be decreased, whereby the locking pins disengage the cavities to release the body from the base. A cover with a lock mechanism is provided to seal an open front face of this known assembly to prevent access to the otherwise exposed arms. The lock rod of the lock mechanism extends along the cross bar and has a rotation axis parallel to the axis of the cross bar. Without the cover anybody can remove the cross bar assembly from the vehicle. When the locking pins are in the locked position the body can rotate slightly relative to the base.

This known assembly requires application of a force to the actuators, both when locking the base to the body and for detaching the base from the body. Furthermore, the locking pins can only be operated by maneuvering the protruding actuator arms, as well as the locking pins require a certain travel length to set opposite locking pins free of the base, thus this known assembly becomes rather voluminous and wide. Locking of base to body is achieved due to an axial displacement of the opposite locking pins away from each other.

It is a main aspect of the present invention to provide a fastening assembly that has a simpler structure than known cross bar fastening assemblies.

It is a further aspect of the present invention to provide a cross bar fastening assembly that does not need a cover to seal and hide operative components.

It is a further aspect of the present invention to provide a cross bar fastening assembly having a minimum of structural components.

It is a further aspect of the present invention to provide a cross bar fastening assembly that does not need actuators and spring-biasing.

It is a further aspect of the present invention to provide a cross bar fastening assembly that is lower than conventional cross bar fastening assemblies.

It is a further aspect of the present invention to provide an inexpensive cross bar fastening assembly.

It is a further aspect of the present invention to provide a cross bar fastening assembly that is easy to mount and demount.

It is a further aspect of the present invention to provide an inexpensive cross bar fastening assembly that has an elegant design.

It is a further aspect of the present invention to provide an inexpensive cross bar fastening assembly that can be adjusted to be mounted on a plurality of different vehicles in many different positions.

It is a further aspect of the present invention to provide an alternative cross bar fastening assembly.

The novel and unique features whereby these and other aspects are achieved according to the present invention consist in that the fastening assembly comprises that:
  the first hinge part comprises a tubular first assembling part that delimits a bore having a first hinge axis,
  the second hinge part comprises a second assembling part comprising a mounting base part delimited between opposite shaft bearings having a second hinge axis, which mounting base part is adapted to pivotally receive the tubular first assembling part, and
  a shaft releaseably arranged through the opposite shaft bearings and through the bore of the tubular first assembling part to pivotably connect the first hinge part and the second hinge part.

The tubular first assembling part is configured substantially as a cylinder having a cylinder wall that fits matingly and pivotably in the mounting base part of the second assembling part between the shaft bearings. The shaft has a length that allows said shaft to reach through both shaft bearings when inserted through the bore of the tubular first assembling part, thereby arranging the shaft pivotably suspended in the opposite shaft bearings through the bore so that the cylinder wall pivot in the mounting base part.

Within the context of the present invention the term "shaft bearing" is a mechanical component that provides for free linear movement of a moving part and for free rotation around a fixed axis of said moving part, which mechanical component is the shaft. The present invention utilizes two shaft bearings, one at each end of the first assembling part. A suitable shaft bearing for use in the present invention may preferably be a simple plain bearing with a hole in which the shaft can be inserted.

To achieve the locked condition of the fastening assembly a single shaft is slidingly inserted through the opposite shaft bearings and extends the full length of the bore when the first hinge part and the second hinge part are assembled. The cylindrical part of the tubular first assembling part mates inside the mounting base part without the need of any substantial frictional engagement, and without the need for spring-biasing and application of force to actuator arms as in the prior art assembly discussed above.

In an embodiment the opposite shaft bearings may be comprised of a first shaft bearing having a first shaft opening and being configured to be arranged at one end of a mounting base of the second assembling part, and an opposite second shaft bearing having a second shaft opening and being configured to be arranged at the opposite end of the mounting base of the second assembling part.

Accordingly the opposite shaft bearings may be comprised of a first shaft bearing constituting a shaft receiving end bearing and an opposite second shaft bearing constituting a locking end bearing. The first shaft bearing and the second shaft bearing are arranged a distance from each other corresponding to a distance selected to receive the tubular first assembling part. The first shaft bearing may have a first shaft opening and the second shaft bearing may have a second shaft opening for in common receiving and supporting the shaft when the tubular first assembling part is arranged in the mounting base part.

The shaft may be an integral unit comprised of a longitudinal shaft part having a free shaft end with a shaft end wall and an enlarged head at the end opposite the shaft end wall. The enlarged head may advantageously serve as a back stop when the longitudinal shaft part of the shaft is inserted through the first shaft opening of the first shaft bearing, whereby a shaft facing end of the enlarged head abuts the adjacent first shaft bearing while allowing the shaft to reach through the bore of the tubular first assembling part shaft opening and into and through the second shaft opening of the opposite second shaft bearing.

The second shaft bearing may constitute a locking end part bearing that may have a lock housing defining a lock chamber that accommodates a first lock means, and the shaft end wall of the free end of the shaft may have a second lock means configured to interlock with the first lock means in any selected pivoted position of the first hinge part in relation to the second hinge part. Interlocking of the first lock means and the second lock means can in such an arrangement take place in the confined space inside the lock chamber after insertion of the free shaft end of the longitudinal shaft part of the shaft, thereby obtaining a hidden tamper-free interlocking of the first hinge part and the second hinge part without the need of securing of a separate cover part.

Preferably the diameter of the shaft at the free shaft end of the shaft may correspond to the diameter of the second shaft opening, thus the entry opening to the lock chamber, so that the free shaft end seals the entry to the lock housing and eliminates the need for an additional seal means.

In order to achieve an efficient interlocking of the first lock means and the second lock means inside the lock chamber the first lock means may comprises a T-member comprising a cross member situated on one end of a lock rod having a lock rod axis co-axial with or parallel to any of the first and second hinge axes. The lock rod may extend lengthwise inside the lock chamber and have exterior lock means at the end opposite the cross member. The exterior lock means are accessible from outside the lock housing to rotate the lock rod about its lock rod axis to interlock the first lock means and the second lock means.

Firm interlocking can be achieved in an embodiment wherein the second lock means may comprise a slot in the shaft end wall, wherein said slot can be dimensioned to receive the cross member to allow the cross member to pass in and out of the slot in an unlocked state of the fastening assembly. For the slot and the cross member to interlock firmly, in a simple and reliable manner, the cross member may have a length that is longer than the width of the slot whereby the first hinge part and the second hinge part can interlock in response to rotating the lock rod into a position wherein the longitudinal axis of the cross member is rotated about the lock rod axis, e.g. rotated 90°, in relation to the longitudinal axis of the slot, thereby positioning the cross bar inside the longitudinal shaft part at the free shaft end, crosswise the slot, in engagement with the shaft end wall.

The second assembling part may have a shock absorber means or a damper means that is arranged at the mounting base part to reciprocate substantially perpendicular to the second hinge axis. The shock absorber means or damper means can be pushed in engagement with the subjacent support for the mounting base part.

As the fastening assembly of the present invention does not rely of spring-biased locking pins or frictional engagement between the first hinge part and the second hinge part there can be a slight clearance between the shaft bearings and the shaft which may cause some noise when the vehicle runs, e.g. at bumpy roads. As a precaution under such circumstances the shock absorber means or damper means may have a length that enables it to push on the longitudinal shaft part so that it cannot vibrate in the shaft openings of the shaft bearings.

The cross bar mounting part has a main mounting body configured to mount the fastening assembly to the cross bar. To that aspect the main mounting body may have a cross bar mounting face and an opposite coupling face, which coupling face is provided with the tubular first assembling part. The tubular first assembling part may protrude from the main plane of the mounting body to be able to be lowered into the mounting base part of the second assembling part. At opposite ends of the protruding tubular first assembling part the main mounting body may extend into opposite pivot parts having a curvature adapted to receive the convex curvature of the enlarged head and the lock housing, respectively.

In a preferred embodiment the enlarged head and the lock housing have same exterior curvatures. When the opposite convex curvatures have same radii the vehicle mounting part can be secured in any lengthwise orientation to a track of a guide rail of a vehicle bed cover or on top of a side wall of a vehicle, as well as the enlarged head and the lock housing can be accommodated in any of the pivot parts without concerns to orientation. It does not matter whether the lock housing faces towards the front or the back of the vehicle, the exterior lock means is equally accessible. Accordingly, none of the vehicle mounting part and the cross bar mounting part is orientation-limited.

The invention further relates to a cross bar comprising the fastening assembly disclosed above.

A particular suited cross bar for use with the fastening assembly according to the present invention has an exterior convex surface that has a curvature substantially complementary to the curvature of the cross bar mounting face of the cross bar mounting part so that said cross bar mounting part rests firmly on top of and in contact with the cross bar.

Preferably the cross bar has a lengthwise extending mounting slot adapted for securing of the cross bar mounting part.

The mounting slot may e.g. be configured as a T-slot having a lengthwise extending mounting opening that is smaller than the width of the bottom of the mounting slot. The means for securing of the cross bar mounting part may in such a configuration e.g. be one or more T-headed bolt(s). The head of the T-headed bolt is simply inserted in the mounting slot and the head turned in engagement with the walls of the cross bar delimiting the lengthwise extending mounting opening. In the assembled state of the cross bar and the cross bar mounting part the first hinge axis is substantially perpendicular to a longitudinal axis of the cross bar.

In a preferred embodiment the cross bar can be symmetrical about its traverse axis so that said cross bar is not orientation-limited either.

In an optional embodiment both opposite lengthwise extending surfaces of the cross bar can be configured as exterior convex surfaces with lengthwise extending mounting slots, so that the vehicle mounting part can be secured to any of said surfaces.

In fact fastening assemblies in accordance with the present invention can even be mounted to both opposite cross bar mounting faces to also suspend or support objects in positions facing towards the vehicle, such as objects located inside a truck bed.

The invention further relates to a method of mounting the above disclosed cross bar, which is provided with one or more fastening assemblies according to the present invention, across a vehicle bed, such as a truck bed or pick-up bed.

The method comprises the steps of
a) securing a vehicle mounting part of a fastening assembly to each of opposite bed tracks of guide rails of a vehicle bed cover or on top of each side wall of a vehicle so that a second hinge axis is in parallel with said track for a roll-up cover or with a side wall of the vehicle,
b) providing a cross bar with opposite cross bar mounting parts of the fastening assemblies in a spaced apart relationship whereby the distance between the first hinge axes of opposite tubular first assembling parts corresponds to the distance between the opposite second hinge axes of the second assembling parts of the vehicle mounting parts secured in step a),
c) arranging the tubular first assembling part in the mounting base part of the second assembling part, and
d) passing the shaft through a first shaft bearing of the second assembling part, through the bore of the tubular first assembling part, and into the second shaft bearing that has a lock housing that receives a free shaft end of the shaft, so as to pivotably connect the first hinge part and the second hinge part of each of the fastening assemblies.

The method may further comprise step e) of rotating a lock rod situated in the lock housing about its lock rod axis, which lock rod axis is co-axial with or parallel to any of the first and second hinge axes, so that a cross member at the end of the lock rod can engage and disengage a slot in the shaft end wall of the shaft to lock and unlock, respectively the first hinge part and the second hinge part in any pivoted position of said hinge parts in relation to each other.

The invention will now be described in further details with references to the drawing in which.

A vehicle with a vehicle bed, such as a truck bed or pick-up bed, and/or a corresponding vehicle bed cover are known to the person skilled in the art and therefore not shown in the figures.

It is assumed below, just for simplicity, that the cross bar 1 with the opposite fastening assemblies 2 are used on a truck bed having a roll-up truck bed cover running in guide rails mounted on top of the side walls of the truck bed, and wherein the guide rails have lengthwise extending tracks for mounting the fastening assemblies 2 and other components. The invention can however also be used as or in a roof rack.

Figures 1A, 1B:
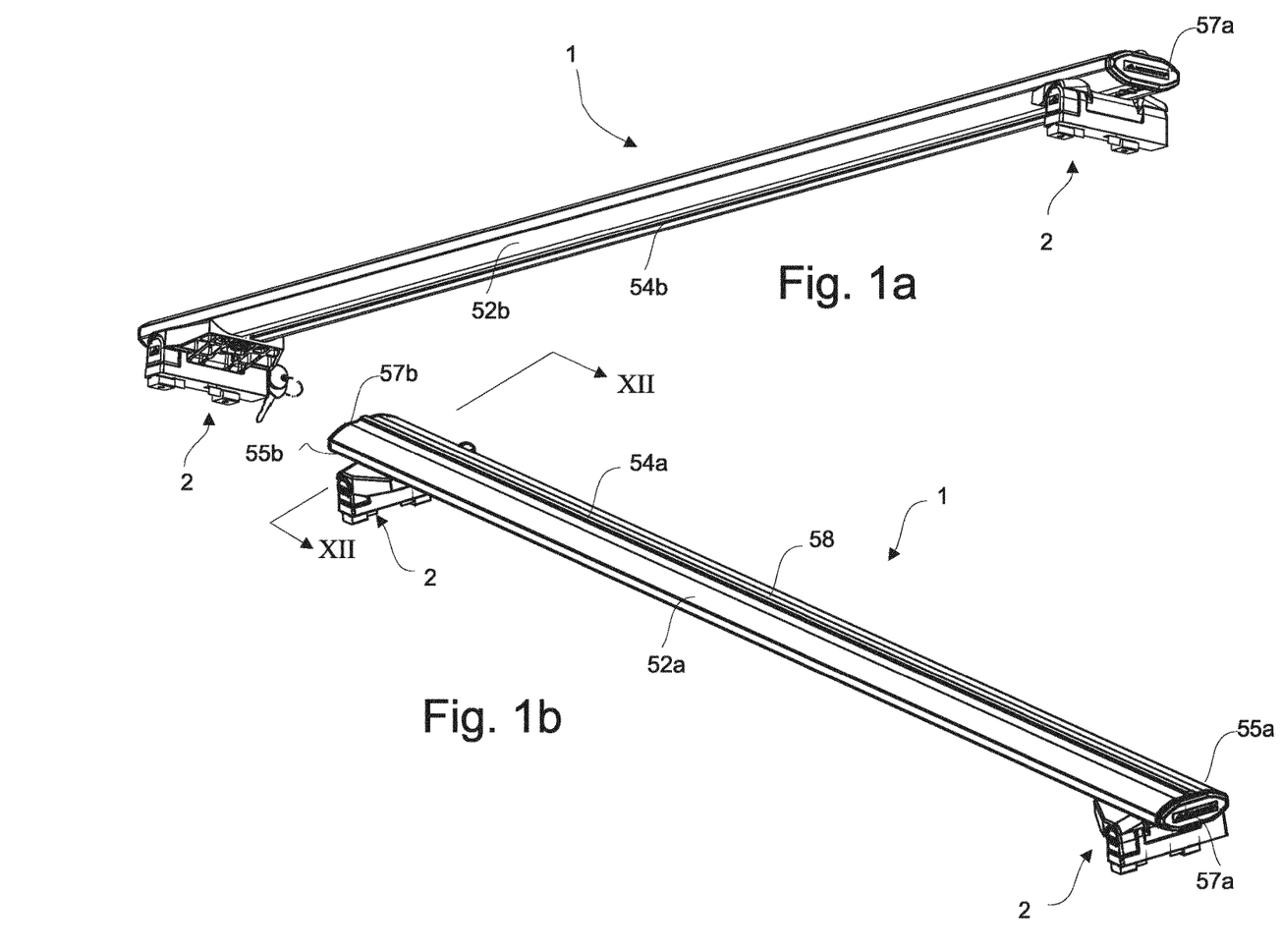
FIGS. 1a and 1b are perspective side views of a cross bar provided with a fastening assembly at both ends, and seen from below and above, respectively.

The load-carrying cross bar 1 seen in FIGS. 1a and 1b is provided with two spaced apart fastening assemblies 2 adapted for releasably connecting said load-carrying cross bar 1 to lengthwise extending tracks provided in guide rails mounted on top of the opposite side walls of a truck bed. The guide rails can e.g. be the guide rails for a roll-up truck bed cover, such as the roll-up truck bed cover described in the applicant's international patent applications nos. WO2019/206388A1 and WO2020/229401A1. In the alternative the fastening assemblies 2 can simply be screwed to the side walls of the cargo space, the bed, of a truck,—thus directly on top of the side wall of the truck bed, or a rail or a short section of a rail with a suitable track can be secured on top of the side wall as an intermediate fastening member.

Figure 2:
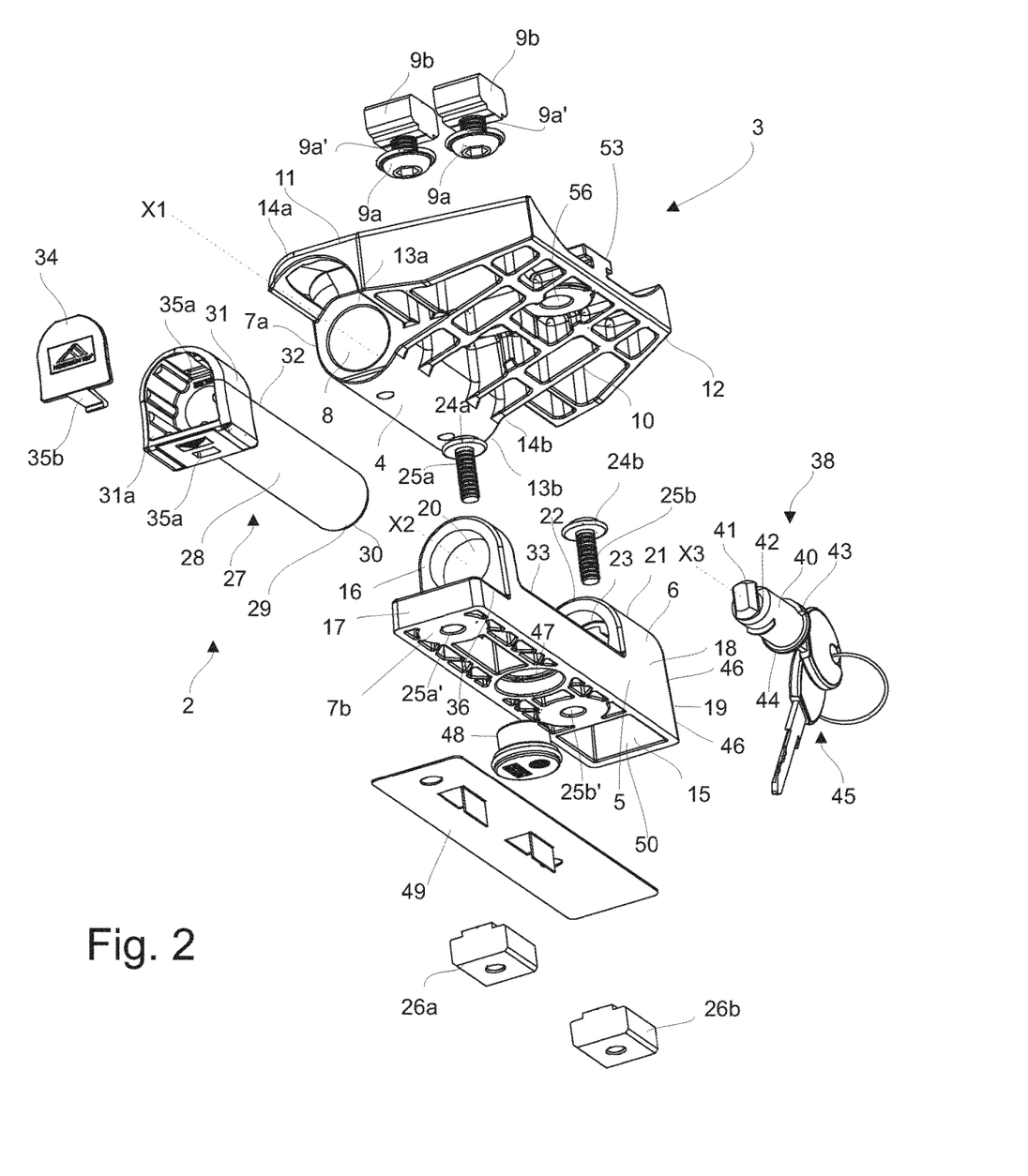
FIG. 2 is an exploded perspective view of a fastening assembly seen from below.
Figures 3, 4:
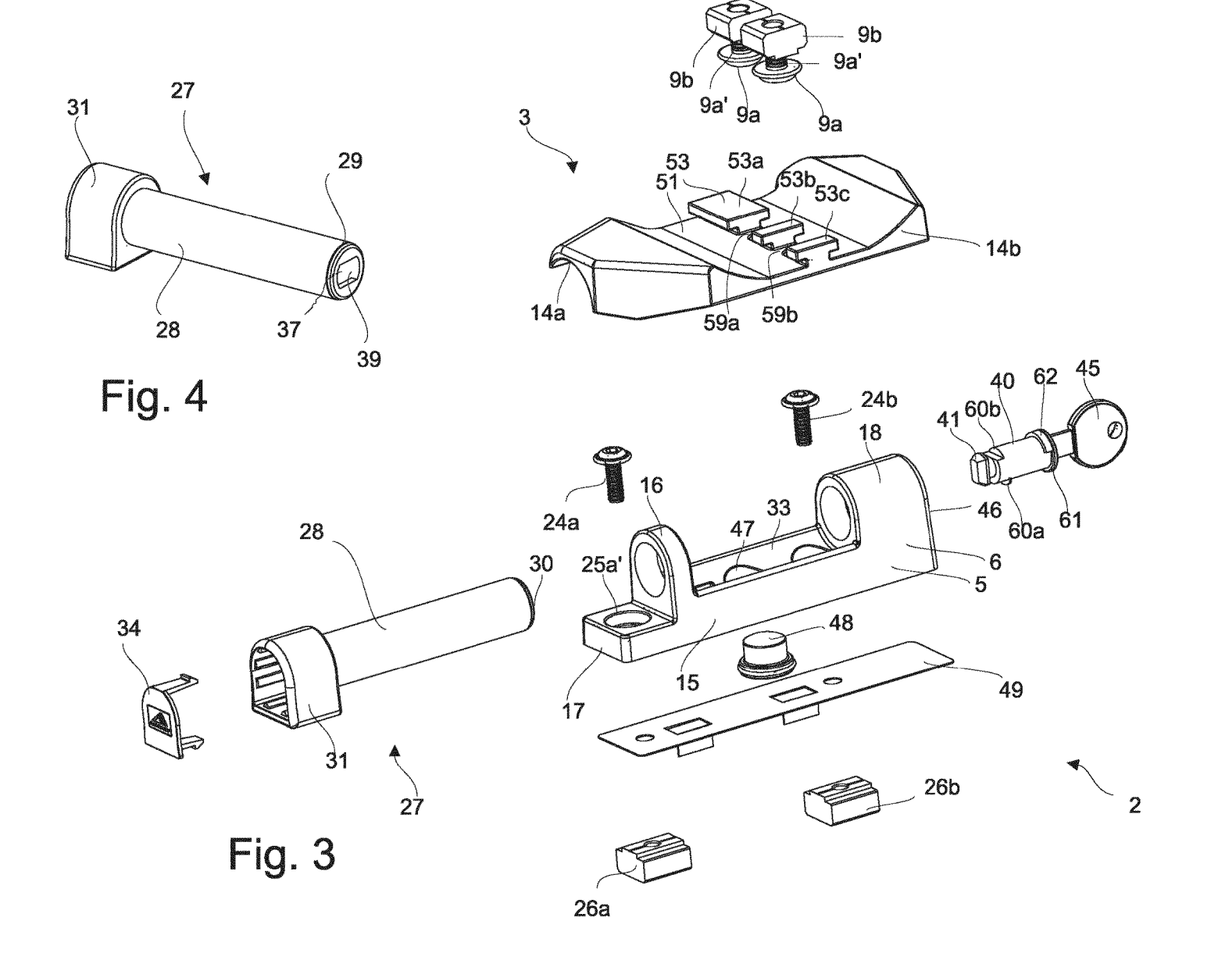
FIG. 3 shows the same in an oblique side view.
FIG. 4 shows the shaft from the free shaft end.
Figure 7:
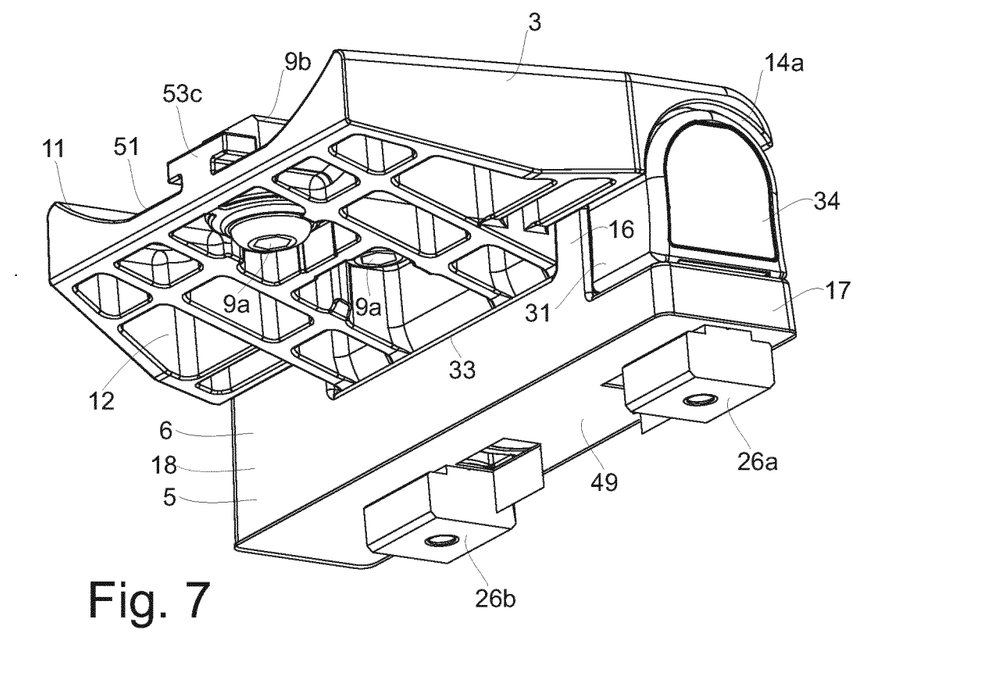
FIG. 7 shows the fastening assembly in assembled state seen from below and without a cross bar.
Figure 8:
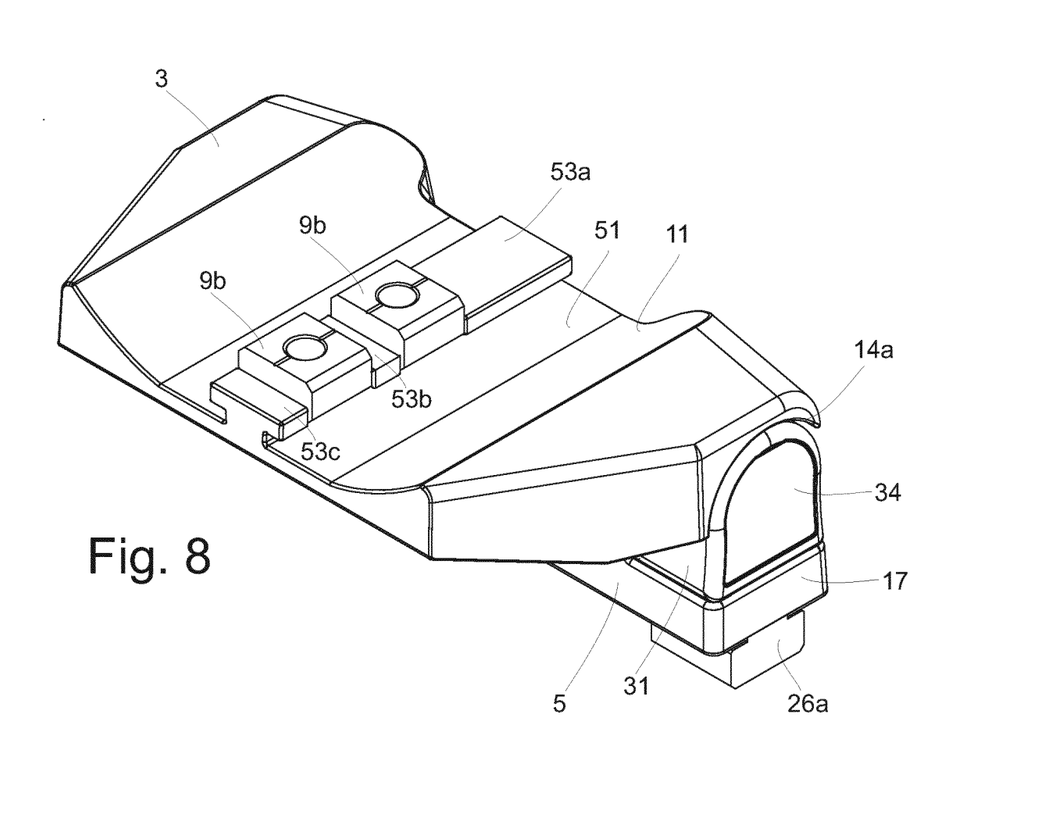
FIG. 8 shows the same seen from above.

The components of a fastening assembly 2 according to the present invention are seen in more details in the drawing, in particular in the exploded views of FIGS. 2 and 3. The fastening assembly 2 is seen in assembled state in FIGS. 7 and 8, but not mounted on a cross bar.

Figure 5:
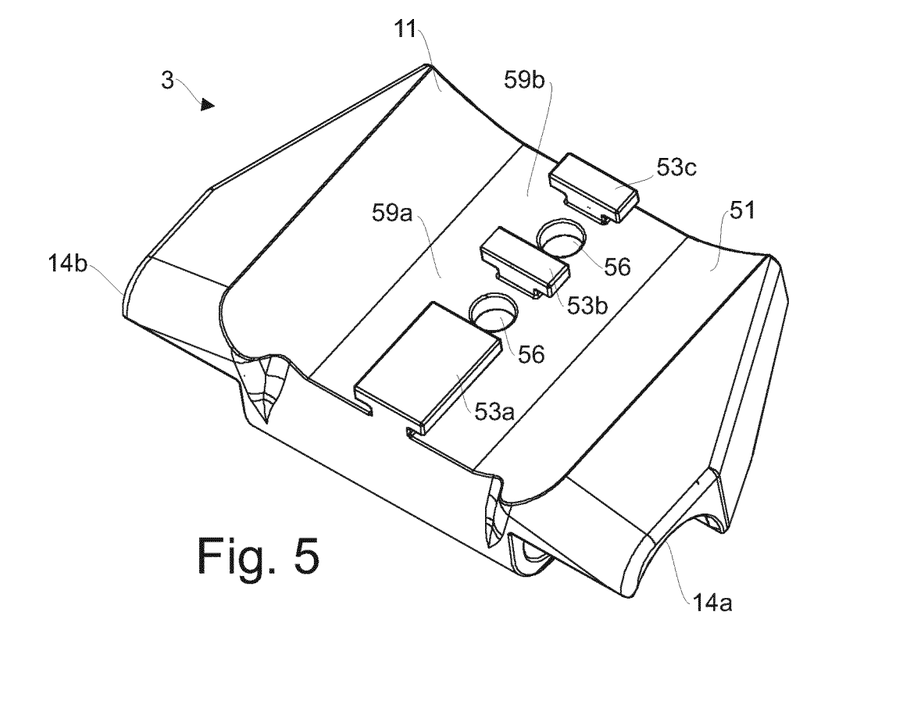
FIG. 5 shows the cross bar mounting part from the cross bar mounting face.
Figure 6:
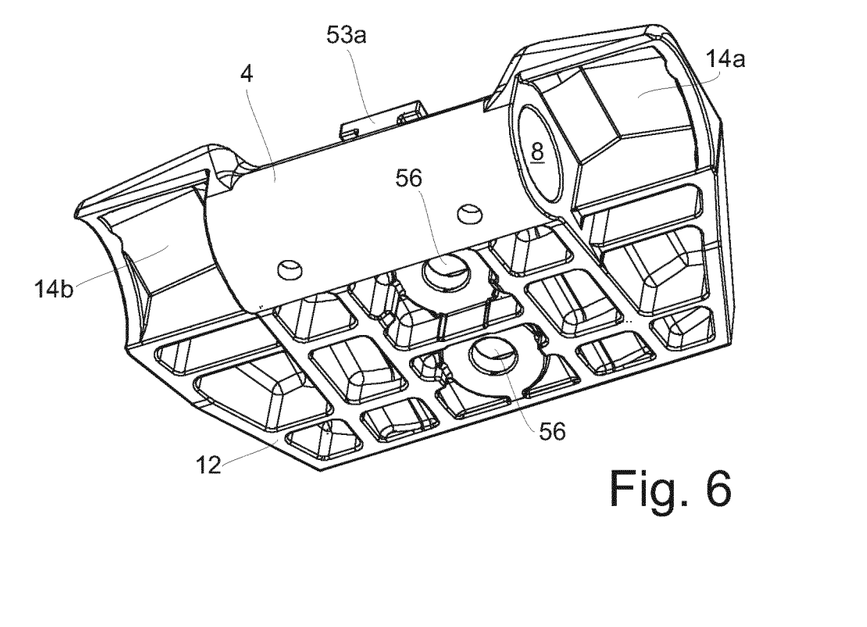
FIG. 6 shows the cross bar mounting part from the coupling face.

The fastening assembly 2 has a cross bar mounting part 3 with a protruding first hinge part 4, and a vehicle mounting part with a second hinge part 6 adapted for releasably and pivotably coupling with the first hinge part 4. More details of the structure of the cross bar mounting part 3 are seen in FIGS. 5 and 6.

The first hinge part 4 comprises a cylindrical tubular first assembling part 7a that delimits a bore 8 having a first hinge axis X1. The cross bar mounting part 3 further comprises two bolts 9a with corresponding T-nuts 9b for fastening cross bar mounting part 3 to the cross bar 1 as seen in the cross-sectional view of FIG. 12. In some embodiments a single bolt and T-nut may suffice to fasten the cross bar mounting part 3 firmly to the cross bar 1.

The cross bar mounting part 3 has a main mounting body 10 with a cross bar mounting face 11 and an opposite coupling face 12 wherefrom the cylindrical tubular first assembling part 7a protrudes towards the second hinge part 6. At opposite ends 13a, 13b of the tubular first assembling part 7a the main mounting body 10 extends into opposite mainly concave pivot parts 14a, 14b, as seen in FIG. 6.

The vehicle mounting part 5 has a second assembling part 7b that has a mounting base 15 for fastening the fastening assembly 2 to the vehicle (not shown). The mounting base 15 has a first shaft bearing 16, which is retracted from a first end 17 of the mounting base 15 and protrudes upright from said mounting base 15, and a second shaft bearing 18, which is arranged at a second end 19 of the mounting base part 15 opposite the first end 17 and protrudes upright from said mounting base 15. The first shaft bearing 16 has a first shaft opening 20. The second shaft bearing 18 serves as a lock housing 21 that delimits a lock chamber 22 with a second shaft opening 23. The second shaft bearing 18 has an exterior curvature that mates inside any of the pivot parts 14a, 14b. The components of the vehicle mounting part 5 are seen in assembled state in FIG. 9.

The vehicle mounting part 5 can be fastened to a T-track of a guide rail for a roll-up truck bed cover by means of bolts 24a, 24b having stems 25a, 25b inserted through fastening holes 25a', 25b' in the mounting base 15 to be screwed together with T-nuts 26a, 26b arranged matingly in the T-track (not shown) in sliding engagement to enable positioning and fastening of the fastening assembly 2 at any position along the guide rail (not shown) of the roll-up truck bed cover (not shown).

The vehicle mounting part 5 further comprises a shaft 27 that has a longitudinal shaft part 28 having a free shaft end 29 with a shaft end wall 30 and an enlarged head 31 at the end 32 opposite the shaft end wall 30. The enlarged head 31 has an exterior curvature that mates inside any of the pivot parts 14a, 14b. A free open end 31a of the enlarged head 31 can be closed by an end cap 34. To this purpose the enlarged head 31 has snap coupling openings 35a to receive an axially protruding snap coupling leg 35b of the end cap 34. The end cap 34 may in this way be releasable from the enlarged head 31 to get access to the interior of the hollow shaft 27. In the alternative the shaft 27 is moulded as a single unitary part without detachable components.

A longitudinal mounting base part 33 extends lengthwise along a second hinge axis X2 of the shaft bearings 16, 18. In an assembled state the shaft 27 is inserted into the opposite shaft bearings 16, 18 the enlarged head 31 abuts the exterior face of the first shaft bearing 16 and rest on a protruding part 36 of the mounting base 15.

Figure 12:
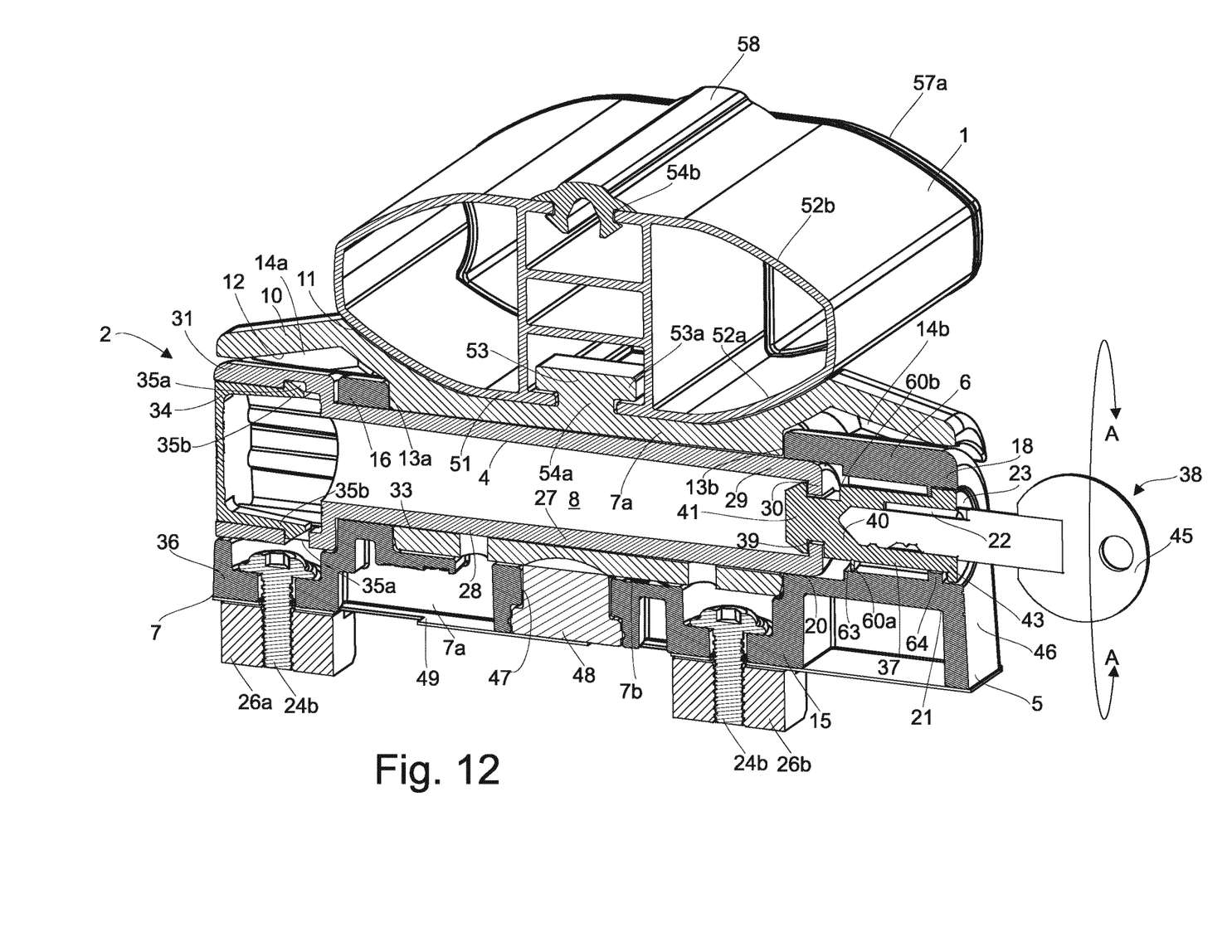
FIG. 12 shows a section taken along line XII-XII in FIG. 1b.

As seen best in the cross sectional view of FIG. 12 to lock the first hinge part 4 and the second hinge part 6 together the free shaft end 29 is inserted through the first shaft opening 20 to extend the full length of the longitudinal mounting base part 33 between the shaft bearings 16, 18. The free shaft end 29 passes along the longitudinal mounting base part 33 through the second shaft opening 23 and into the lock chamber 22 of the second shaft bearing 18, so that a second lock means 37 at the free shaft end 29, as seen in FIG. 4, can interlock with a first lock means 38 situated inside the lock chamber 22.

As seen in FIG. 4 the second lock means 37 is a slot 39 in the shaft end wall 30. The first lock means 38 comprises a lock rod 40 having a cross member 41 at a free end 42 that faces the second shaft opening 23, exterior lock means in form of a lock end part 43 at the lock rod end 44 opposite the cross member 41, and a means 45 to rotate the lock rod 40 about its lock rod axis X3. The lock end part 43 is situated in an end wall 46 of the second shaft bearing 18 to be accessible from outside said lock housing 21. The means 45 to rotate the lock rod 40 about its lock rod axis X3 can e.g. be a key inserted into a keyhole in the lock rod 40. The cross member 41 can pass into the slot 39, so that when the cross member 41 is rotated traverse the slot 39, as indicated by double arrow A in FIG. 12, the slot 39 and cross member 41 firmly interlock so that the shaft 27 cannot be pulled free of the shaft bearings 16, 18.

The mounting base 15 has a central hole 47 for optionally plugging by a traversely and reciprocatingly arranged damper 48.

In the assembled state of the fastening assembly 2 the damper 48 may in some embodiments push the longitudinal shaft part 28 upwards in a direction towards the interior face of the cylindrical tubular first assembling part 7a, so that the shaft 27 cannot vibrate or oscillate during driving which could result in an annoying noise. In other embodiments the damper 48 absorbs vibration or oscillations of the fastening assembly 2 in relation to the vehicle without acting on the shaft 27. The damper 48 can be made of a resilient material, such as silicone or rubber.

A support sheet 49 is arranged below the lower face 50 of the mounting base 15, on the one hand to prevent that the damper 48 gets free of its frictional engagement inside the central hole 47 and is lost, and on the other hand to serve as a retainer seal against the guide rail of the roll-up truck bed cover. The support sheet 49 is assembled to the mounting base 15 below the damper 48 using the same T-headed bolts 24a, 24b as used to secure the fastening assembly 2 to the track of the guide rail.

To mount a cross bar mounting part 3 of an assembly 1 to a cross bar 1 the cross bar mounting face 11 has a curved mounting cavity 51 having a curvature substantially complementary to the curvature of a free mounting 52a, 52b of the cross bar 1, as seen best in FIGS. 1a, 1b and 12.

As seen in e.g. FIGS. 5 and 6 the curved mounting cavity 51 has a lengthwise extending protruding T-key means 53 that can be slidingly inserted and accommodated into a substantially complementarily shaped longitudinal mounting slot 54a, 54b, such as a T-slot, in any of the free mounting surfaces 52a, 52b of the cross bar 1, whereby T-slot 54a, 54b and T-key means 53 can be locked firmly together. Preferably both free mounting surface 52a, 52b of the cross bar 1 are configured with longitudinal T-slots 54a, 54b to serve as free mounting surfaces 52a, 52b and thereby improving the usability of the cross bar 1. The lengthwise extending T-key means 53 can easily be slid into the T-slots 54a, 54b from a free end 55a, 55b of the cross bar 1 to move a T-nut 9b along above a mounting hole 56 in the cross bar mounting part 3, to allow the stems 9a' of the bolts 9a to pass through said mounting hole 56, and the bolts 9a to be screwed firmly together with the T-nuts 9b for securing of the cross bar mounting part 3 in the correct position for the cross bar 1 to be mounted to the guide rail of the truck bed. Once opposite cross bar mounting parts 3, or the entire fastening assemblies 2, have been fastened in the desired opposite positions on the cross bar 1 the free ends 55a, 55b of the cross bar 1 are plugged with end plugs 57a, 57b and at least the upper longitudinal T-slot 54a, 54b sealed with a gasket strip 58.

As seen in FIGS. 3 and 5 the lengthwise extending T-key means 53 has three spaced apart T-key means sections 53a, 53b, 53c. Two T-nuts 9b are arranged in the spaces 59a, 59b between the T-key means sections 53a, 53b, 53c and thus guided by the T-key means 53 into position above corresponding mounting holes 56 of the cross bar mounting part 3.

Figures 9, 10, 11:
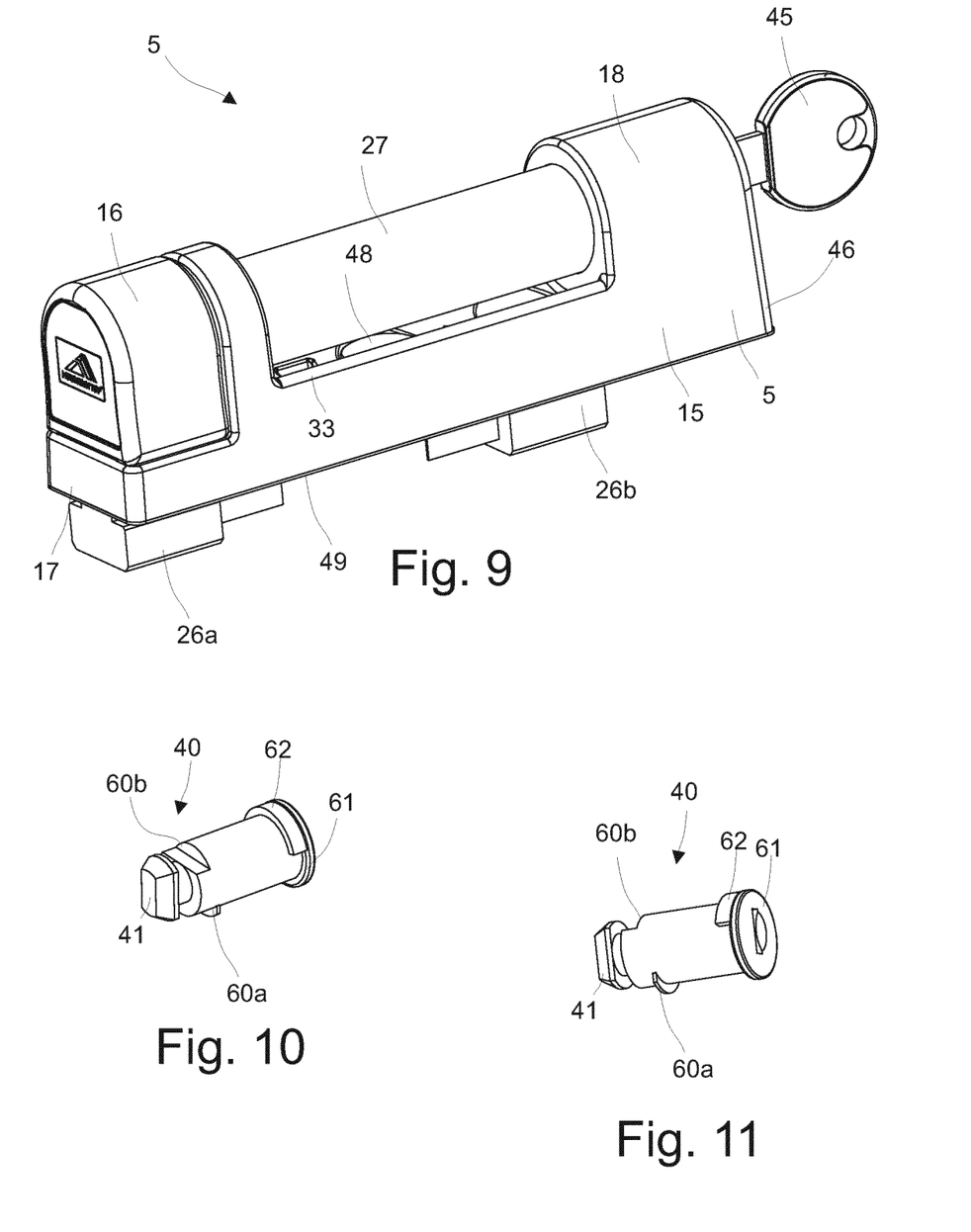
FIG. 9 shows, in perspective side view, the vehicle mounting part with the shaft inserted through the shaft bearings, and not assembled to any of the cross bar mounting part or the vehicle.
FIG. 10 is a perspective view of the lock rod seen from the cross member.
FIG. 11 shows the same seen from the opposite end.

The lock rod 40 which is seen in FIGS. 10 and 11, has a first radial protrusion 60a, 60b that engages a first recess or first stop 63 inside the lock housing 21 to prevent the lock rod from being pulled out of the lock housing 21. The lock end part 43 may have a second radial protrusion 61 that engage the lock housing 21 to further prevent the lock rod 40 from being pulled out of the lock housing 21. A third radial protrusion 62 extends a sector of a circle of about 90° around the lock rod 40 at the lock end part 43. When the lock rod 40 is rotated the third radial protrusion 62 hits on a second stop 64 inside the lock housing 21, which second stop 64 is arranged so that when the lock rod 40 is rotated into the locked position the third radial protrusion 62 hits the second stop and the cross member 41 is crosswise the slot 39. When the lock rod 40 is rotated in the opposite direction the cross member 41 is rotated parallel to the slot 39 and set free. Thus the third radial protrusion 62 limits the angle of rotation of the lock rod 41.

The above structural features to retain the lock rod inside the lock housing in a limited rotational but not translatory arrangement is only exemplary and other structural feature by means of which same properties can be achieve can quite as well be used.

The invention claimed is:

1. A fastening assembly adapted for releasably connecting a load-carrying cross bar to a vehicle, the fastening assembly comprises:
    a cross bar mounting part with a protruding first hinge part, and
    a vehicle mounting part with a second hinge part adapted for releasably and pivotably coupling with the first hinge part,
    the first hinge part comprises a tubular first assembling part that delimits a bore having a first hinge axis,
    the second hinge part comprises a second assembling part comprising a mounting base part delimited between opposite shaft bearings and having a second hinge axis,
    which mounting base part is adapted to pivotally receive the tubular first assembling part, and
    which opposite shaft bearings are comprised of a first shaft bearing having a first shaft opening and being configured to be arranged at one end of a mounting base of the second assembling part, and an opposite second shaft bearing having a second shaft opening and being configured to be arranged at an opposite end of the mounting base of the second assembling part,
    the fastening assembly further comprises a shaft releasably arranged through the opposite shaft bearings and the bore of the tubular first assembling part to pivotably connect the first hinge part and the second hinge part wherein
    the second shaft bearing is a locking end bearing having a lock housing defining a lock chamber that accommodates a first lock means, and
    the shaft has a shaft end wall that has a second lock means in any selected pivoted position of the first hinge part in relation to the second hinge part.

2. A fastening assembly according to claim 1 wherein the shaft is comprised of a longitudinal shaft part having a free shaft end with the shaft end wall and an enlarged head at the end opposite the shaft end wall.

3. A fastening assembly according to claim 2 wherein the enlarged head and the lock housing have same exterior curvatures.

4. A fastening assembly according to claim 1 wherein the first lock means comprises a T-member comprising a lock rod with a cross member at one end thereof.

5. A fastening assembly according to claim 1 wherein the lock rod has a lock rod axis co-axial with or parallel to any of the first hinge axis and the second hinge axis, which lock rod extends lengthwise inside the lock housing and is rotatable about the lock rod axis.

6. A fastening assembly according to claim 5 wherein the lock rod has an exterior lock means at the end opposite the cross member, which exterior lock means extends through the lock housing to be accessible from outside said lock housing.

7. A fastening assembly according to claim 5 wherein the second lock means comprises a slot in the shaft end wall of the shaft.

8. A fastening assembly according to claim 7 wherein the slot is dimensioned to receive the cross member to allow the cross member to pass in and out of the slot in an unlocked state of the fastening assembly.

9. A fastening assembly according to claim 7 wherein the cross member has a length that is longer than the width of the slot to lock the first hinge part and the second hinge part together in response to rotating the lock rod about the lock rod axis into a position wherein a longitudinal axis of the cross member is rotated in relation to a longitudinal axis of the slot.

10. A fastening assembly according to claim 1 wherein the second assembling part has a shock absorber means or a damper means that is arranged at the mounting base part to reciprocate substantially perpendicular to the second hinge axis.

11. A fastening assembly according claim 1 wherein the cross bar mounting part has a main mounting body, the main mounting body has a cross bar mounting face and an opposite coupling face, and the coupling face is provided with the tubular first assembling part protruding from said coupling face.

12. A fastening assembly according to claim 11 wherein at opposite ends of the tubular first assembling part the main mounting body extends into opposite pivot parts having a curvature adapted to receive a convex curvature of an enlarged head of the shaft and of the lock housing, respectively.

13. A cross bar comprising the fastening assembly according to claim 1 wherein:
    the cross bar has an exterior convex mounting face that has a curvature complementary to the curvature of a cross bar mounting face of the cross bar mounting part, and
    a lengthwise extending mounting slot adapted for securing of the cross bar mounting part, so that a first hinge axis is substantially perpendicular to a longitudinal axis of the cross bar.

14. A cross bar according to claim 13 wherein the cross bar is symmetrical about its traverse axis.

15. A method of mounting a cross bar according to claim 1 across a vehicle bed, such as a truck bed or pick-up bed, wherein the cross bar is provided with one or more fastening assemblies wherein the method comprises the steps of
    a) securing a vehicle mounting part of a fastening assembly to each of opposite tracks of guide rails of a vehicle bed cover, or on top of each side wall of a vehicle, so that a second hinge axis is in parallel with said track for a roll-up cover or with a side wall of the vehicle,
    b) providing a cross bar with opposite cross bar mounting parts of the fastening assemblies in a spaced apart relationship whereby the distance between the first hinge axes of opposite tubular first assembling parts corresponds to the distance between the opposite second hinge axes of the second assembling parts of the vehicle mounting parts secured in step a),
    c) arranging the tubular first assembling part in the mounting base part of the second assembling part, and
    d) passing the shaft through a first shaft bearing of the second assembling part, through the bore of the tubular first assembling part, and into the second shaft bearing of the second assembling part, which second shaft bearing has a lock housing that receives a free shaft end of the shaft, so as to pivotably connect the first hinge part and the second hinge part of each of the fastening assemblies.

16. A method according to claim 15 wherein the method comprises step e) of rotating a lock rod situated in the lock housing about its lock rod axis, which lock rod axis is co-axial with or parallel to any of the first hinge axis and/or second hinge axis, so that a cross member at the end of the lock rod can engage and disengage, respectively, a slot in the shaft end wall of the shaft to lock and unlock the first hinge part and the second hinge part in any pivoted position of said hinge parts in relation to each other.

* * * * *